United States Patent [19]

Yamamoto

[11] 4,437,125
[45] Mar. 13, 1984

[54] DIGITAL SIGNAL PROCESSING METHOD AND APPARATUS

[75] Inventor: Kaichi Yamamoto, Zama, Japan

[73] Assignee: Sony Corporation, Tokyo, Japan

[21] Appl. No.: 315,450

[22] Filed: Oct. 27, 1981

[30] Foreign Application Priority Data

Oct. 27, 1980 [JP] Japan .................... 55-150421

[51] Int. Cl.³ .................................... H04N 5/785
[52] U.S. Cl. ............................. 358/167; 358/327; 358/336; 360/38.1
[58] Field of Search ............ 358/36, 21 R, 51, 160, 358/335, 167, 336, 327, 340, 312, 313; 375/106, 116; 360/22, 38.1

[56] References Cited

U.S. PATENT DOCUMENTS 3,292,162  7/1983  Yamamoto ................ 360/38.1
4,224,642  9/1980  Mawatari .................. 360/38.1
4,288,810  9/1981  Drewery .................... 358/21 R

*Primary Examiner*—Tommy P. Chin
*Attorney, Agent, or Firm*—Lewis H. Eslinger; Alvin Sinderbrand

[57] ABSTRACT

An identification signal is generated to identify a digital signal, such as a digital video signal reproduced by a digital video tape recorder (DVTR), as odd or even. Commencing periodically, such as at the onset of each field interval, identification signals occurring at intervals in the digital signal are sampled, and an odd plurality (e.g., three) thereof determined to be error-free are stored. A synthetic identification signal is generated whose value is determined by the majority of the stored identification signals. The generated signal is then stored, for example, in a cascade of flip-flops, to provide a second synthetic identification signal from the onset of each field interval until the majority of the sampled identification signals is determined. In a circuit for processing a digital video signal, an identification signal for identifying line intervals as even or odd is derived by taking the modulo-two sum of field and frame identification signals to determine the state of the line identification signal at the beginning of each field, and thereafter inverting the identification signal at each line interval.

14 Claims, 15 Drawing Figures

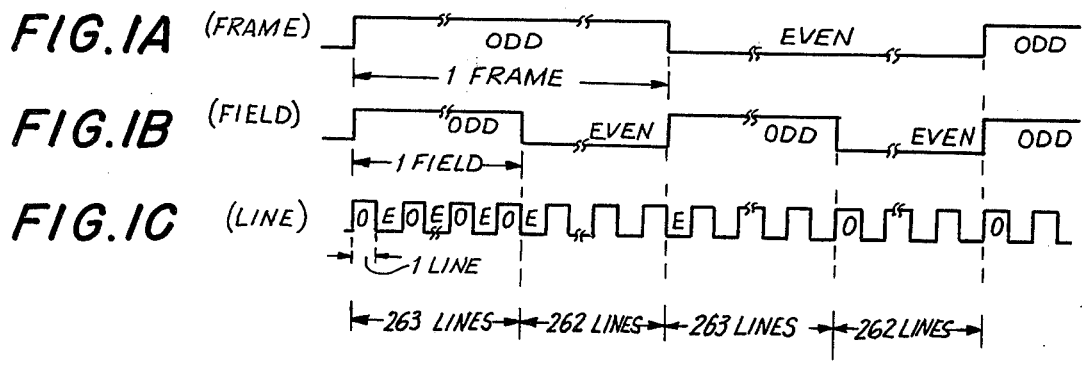
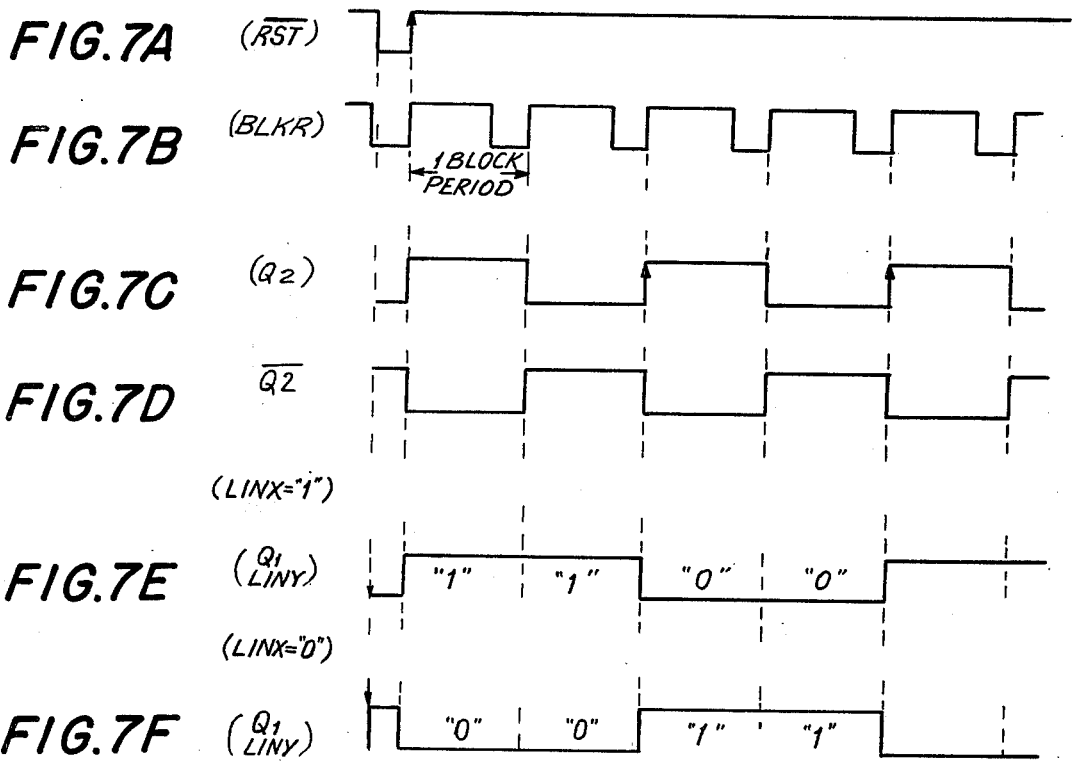

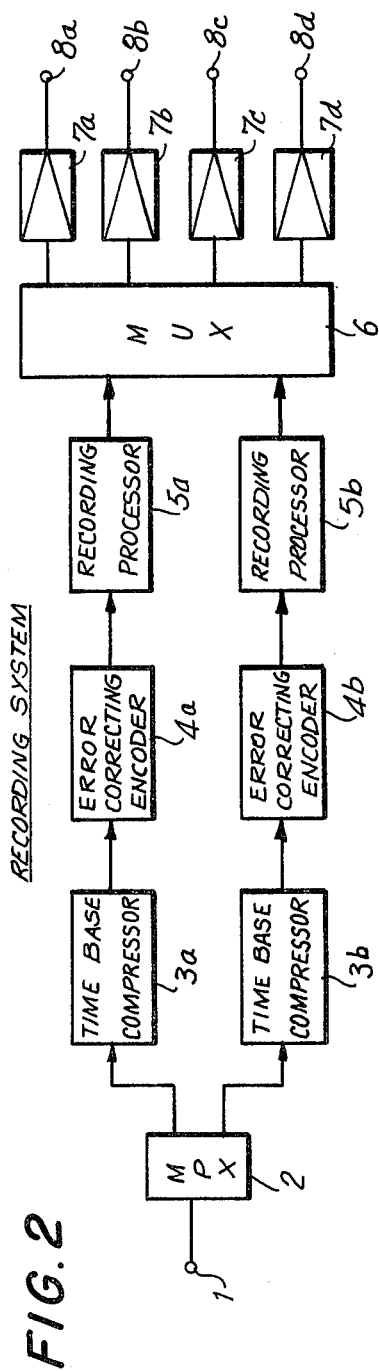
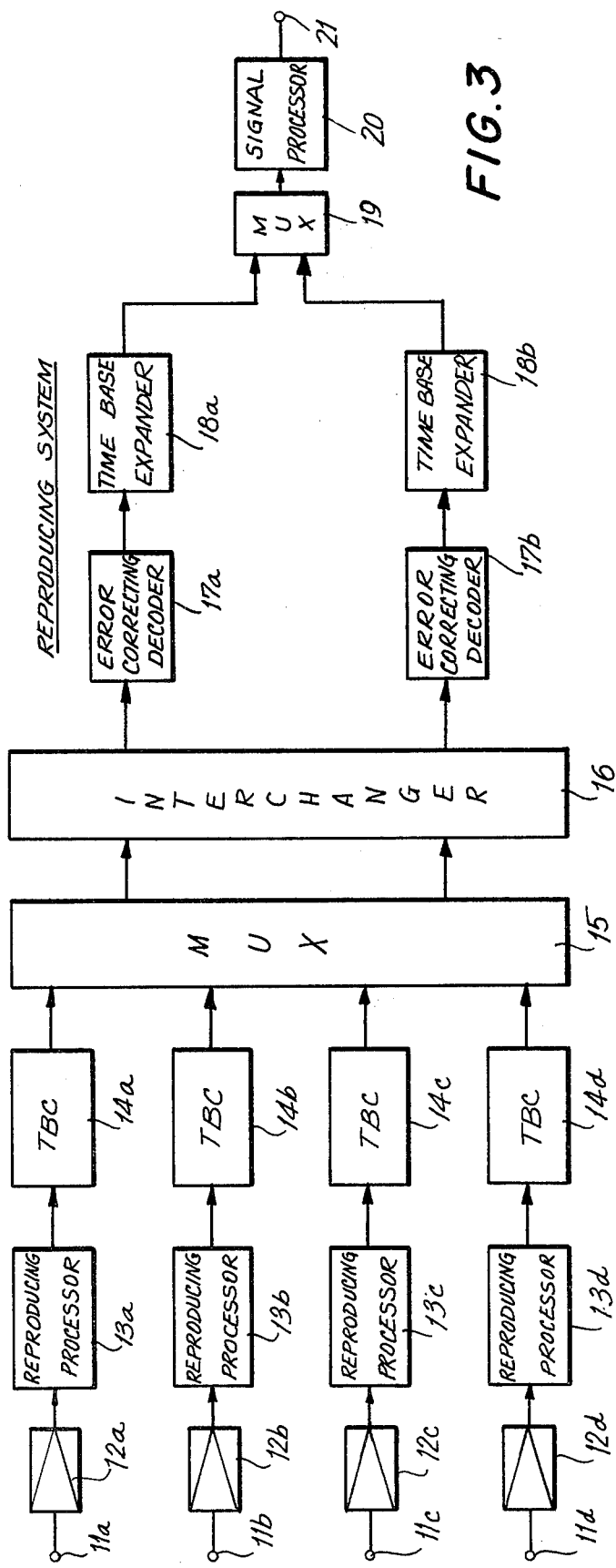
FIG.2
FIG.3

DIGITAL SIGNAL PROCESSING METHOD AND APPARATUS

BACKGROUND OF THE INVENTION

This invention relates to a method and apparatus for processing digital signals and, more particularly, is directed to a method and apparatus for determining the correct state of a control signal contained in transmitted digital signals containing errors, especially digital signals which are recorded and reproduced with a digital video tape recorder.

Recently, digital techniques have been applied to the transmission and recording of video signals. In particular, a rotary head type video tape recorder (VTR) has been used to record pulse code modulated (PCM) video signals on a magnetic tape and, upon playback by the rotary head recorder, the video signals are pulse code demodulated to obtain an analog video signal. In such case, the digital video signals are generally grouped into blocks with each block containing a predetermined number of bits. Upon playback, each block of the reproduced digital video signals is processed as an entity.

However, when a PCM-encoded video signal is recorded and subsequently reproduced, there is the possibility that the reproduced video signals may contain random errors caused by various types of noise, such as head noise, tape noise, and amplifier noise, and may also contain burst errors (signal dropout) resulting from dust, fingerprints, or flaws on the tape surface. It should be appreciated, of course, that such errors may seriously deteriorate the quality of the resulting video picture. In order to minimize this problem, error correction codes have been used in encoding the PCM signals prior to recording on the tape. For example, parity words may be added every predetermined number of blocks of video data and such parity words are then used during the playback process in an error detection operation. By using such error correction codes, erroneous PCM signals may be corrected or compensated so as to avoid the aforementioned deterioration in video playback. It should be appreciated that the more error correction code words that are used, the more accurate is the error detection/correction operation. However, it is also desirable, in achieving such error correction, to reduce the "overhead", or redundancy by keeping the number of error correction bits as small as possible so as to maximize the area of tape that can be used for recording of data.

Further, when the frequency of errors becomes high, so that the number of errors exceeds the error correcting capability of the error correction code, an error concealment operation, rather than an error correction operation, is used. Such operation may be accomplished, for example, by replacing the erroneous video data with video data which are approximately equal thereto. In this regard, a field memory for storing successive fields of video data is provided and an address signal is added to each block of video data for addressing the blocks of video data into the field memory. When the speed of movement of the magnetic tape during playback is faster than that used during recording, the rotary head can be shifted so as to skip over a predetermined number of tracks to reproduce, for example, every other track. During playback at a speed slower than that of recording, the rotary head scans the same track more than once and then jumps over to the next adjacent track. Consequently, the reproduced video data are not of a continuous nature. In this regard, the address signals of the reproduced video data are used to write the video information into the field memory at predetermined addresses so as to obtain a picture having continuity.

When the aforementioned error concealment operation is utilized with a digital color video signal, the phase of the color sub-carrier may be inverted at the connection point between the original erroneous video data and the substituted video data. More particularly, in the case of an NTSC system, consecutive frames are said to alternate between "odd" and "even" frames; that is, the phase of the color subcarrier between corresponding portions of successive frames differs by $\pi/2$. Similarly in successive fields the color subcarrier phase also differs by $\pi/2$, and in consecutive line intervals, the color subcarrier phase also differs by that amount. It should therefore be appreciated that when video data (or field or line) from one frame are substituted for corresponding video information of a successive frame (or field or line), the phase of the color sub-carrier of the substituted video information must be inverted to maintain continuous phase relation of the color sub-carrier. This is explained more fully in U.S. patent application Ser. No. 194,830, filed Oct. 7, 1980, having a common assignee herewith. In this regard, it has been proposed to add an identification signal to the video data for indicating the frame, field, and line to which the video information belongs, or at least to identify whether the frame, field, or line is even or odd. However, if an error results in the identification signal, such phase inversion cannot reliably be performed.

Moreover, to correct more accurately any error caused by drop-out, it has been proposed to add still another error correction code to the video data signal for use in detecting and correcting any error occurring in the address signal in the identification signal in each block of video data. However, such a code having a high capability of error detection and correction tends to make the recorded digital video signal overly redundant, and at the same time requires a high degree of circuit complexity and sophistication, both for the recording and for the playback operations.

OBJECTS AND SUMMARY OF THE INVENTION

Accordingly, it is an object of this invention to provide a method and apparatus for processing a digital signal that avoids the above-described difficulties encountered with the prior art.

More particularly, it is an object of this invention to provide a method and apparatus for processing a digital video signal and which is particularly adapted to assign appropriate control signals to respective blocks of the video signal so that proper color subcarrier phase can be determined without increasing the redundancy of the recorded or otherwise transmitted video signal.

It is another object of this invention to provide a method and apparatus for processing a digital video signal which assigns appropriate control signals thereto during special playback modes of a DVTR.

It is still another object of this invention to provide a method and apparatus for processing a digital signal in which appropriate control signals can be assigned notwithstanding errors occurring in the transmitted video signal.

In accordance with an aspect of this invention, a method of assigning to a transmitted digital signal a control value to indicate whether the digital signal is of an odd state or of an even state involves detecting errors occurring in the digital signal; sampling and storing the value of a control signal detected to be free of errors and occurring at regular intervals in the digital signal for an odd plurality of times (e.g., three times); judging whether the majority of the sampled and stored values indicate the odd state or the even state; providing an identifying signal which is of the odd state or the even state as determined by the majority of the sampled values; and providing the identifying signal as the control value. The method of this invention continues to provide a previously determined identifying signal as the control value until the step of judging is carried out. Preferably, where the digital signal is a digital video signal, the method assigns odd or even values, as appropriate, to identify each transmitted data block thereof as to the odd or even state of its respective field and frame. The state of the line interval with which the data block is associated is initially determined by a logic combination of the control values associated with the respective frame and field, and then is changed for each successive line interval thereafter.

According to another aspect of this invention, apparatus for determining the state of a two-state control signal, such as an identifying signal for identifying whether a digital video signal is even or odd, and which occurs at regular periodic intervals in a transmitted digital signal, comprises detecting circuitry for detecting errors in the digital signal; a sampling circuit for sampling and storing an odd plurality of such control signals determined to be free of errors upon the occurrence of a periodically-occurring signal; a judging circuit for judging whether a majority of the sampled and stored control signals are of one state or of the complementary state, and providing an identifying signal based on the judged state of such majority; a memory device for storing the control signal at least until a successive identifying signal is provided; and a selector coupled to the memory device for providing an identifying signal based on the stored control signal following said periodically-occurring signal, and when said judging has been carried out, providing the identifying signal based on the majority so judged.

These and other objects, features, and advantages of this invention will become apparent from a consideration of the ensuing description, when read in conjunction with the accompanying drawings.

BRIEF DESCRIPTION OF THE DRAWINGS

FIGS. 1A and 1B show the relation of frame, field, and line intervals, and their associated ID signals, in a digital video signal.

FIG. 2 is a block diagram illustrating a recording section of a digital video tape recorder (DVTR) embodying this invention;

FIG. 3 is a block diagram illustrating a playback section of a digital video tape recorder (DVTR) embodying this invention;

FIGS. 7A to 7F are signal waveform charts to which reference will be made in explaining operation of the circuit of FIG. 6.

DETAILED DESCRIPTION OF A PREFERRED EMBODIMENT

In order to facilitate a better understanding of the present invention, there will first be described with reference to FIGS. 1A to 1C the conditions for digital recording of an NTSC color video signal. In particular, since one frame comprises 525 lines, the number of lines selected for a first (third) and a second (fourth) field are 262 and 263, respectively. In the first field, a vertical synchronizing pulse and a horizontal synchronizing pulse are in phase with each other and such field is considered an "odd" field, while the field in which these pulses are out of phase is considered an "even" field.

Figure 4A:
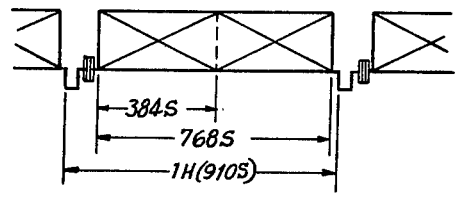
FIGS. 4A and 4B are schematic diagrams to which reference will be made in explaining the digitization and code arrangement of a video signal for use in a DVTR embodying this invention.

Further, the number of sampled picture elements in each horizontal period (H) varies with the sampling frequency ($f_S$) employed. Since the color subcarrier frequency ($f_{SC}$) is 455/2 times the horizontal frequency ($f_H$), the number of sampled picture elements in one horizontal period for a sampling frequency $f_S = 4 f_{SC}$ is 910 samples (FIG. 4A). Moreover, the number of samples in the effective video region or portion of each horizontal period is 768, with the remaining portion of each horizontal period constituting the horizontal blanking interval which includes a horizontal synchronizing signal and a burst signal.

In the NTSC system, the phase of the color subcarrier is inverted in every other line interval. The line interval in which the color subcarrier phase is uninverted are considered even line intervals and the alternate line intervals, in which the color subcarrier phase is inverted, are considered odd line intervals. Because there are 525 line intervals in each frame interval, if the first line interval in one frame interval is odd, it follows that the first line interval in the next successive frame interval will be even. Consequently, the frame intervals are also considered as alternating between odd intervals and even intervals. Further, as mentioned previously, the field intervals also alternate between odd and even.

When an NTSC color video signal is converted to a digital video signal as mentioned above, each portion of the digital video signal must be properly identified as to whether it represents an odd or even frame interval, an odd or even field interval, and an odd or even line interval, so that the horizontal synchronizing pulse and vertical synchronizing pulse will have the proper relation, and so that the correct color phase will be assigned, when the digital signal is converted to an analog digital signal for display on a video viewing screen.

An identification signal ID is added to the digital video signal at periodic intervals therein with portions for identifying each of the respective frame, field, and line intervals represented thereby as even or odd. As shown in FIG. 1A, the signal ID has a portion associated with the state of the frame that is high for 525 successive line intervals (one odd frame interval) and then is low for the following successive 525 line intervals (one even frame interval). As shown in FIG. 1B, the signal ID has a portion, associated with the state of the field interval, that is high for the first 263 line intervals of each frame interval (one odd field interval) and then is low for the following 262 line intervals (one even field interval). As shown in FIG. 1C, the signal ID has a portion, associated with the state of the line, that is high for each odd line interval and then is low for the even line intervals alternating therewith. These three portions of the signal ID are cyclical, and have periods of two frame intervals, two field intervals, and two line intervals, respectively.

Figure 5:
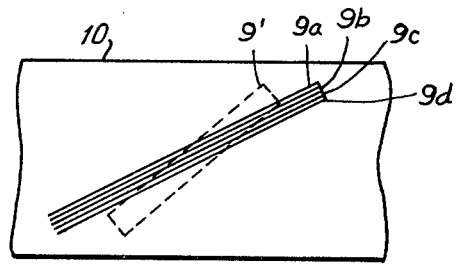
FIG. 5 is a schematic plan view illustrating a track pattern recorded with the recording section of FIG. 2.

In FIG. 2, there is shown a recording section of a DVTR according to this invention having an input terminal 1 to which an NTSC color video signal to be recorded is applied. The color video signal from the input terminal 1 is supplied to a multiplexer 2 in which the digitized effective region of the color video signal in each half-horizontal period (½ H) is divided into two channels. The data of the two channels are processed in the same manner. The data in one of the channels are derived as a record signal after being applied, in sequence, to a time base compression circuit 3a, an error correcting encoder 4a, a recording processor 5a, a multiplexer 6 and recording amplifiers 7a and 7b. The data in the other channel are also processed by a similar arrangement, that is, by a time base compression circuit 3b, an error correcting encoder 4b, a recording processor 5b, a multiplexer 6 and recording amplifiers 7c and 7d. The output signals from the amplifiers 7a-7d are supplied through output terminals 8a-8d to respective four rotary heads (not shown) extending obliquely on a magnetic tape 10, as shown in FIG. 5. It should be appreciated that each scanning operation by the four rotary heads results in one field of video information being recorded in the four parallel tracks 9a-9d collectively.

The code arrangement of each of the record signals respectively provided at the four rotary heads will now be described with reference to FIGS. 4A and 4B. As shown in FIG. 4A, each half-horizontal period of effective video information includes 384 samples and this half horizontal period of video information is divided into four blocks of 96 samples each, with each block being supplied at the output terminals 8a-8d of the recording section of FIG. 2. The time compression circuit 3 in each channel compresses the video signal to provide a data blanking period for each block of video information into which a synchronizing signal, an identification signal, and error correction words can be inserted. This is shown more particularly in FIG. 4B in which each block of the coded digital signal (video data or parity data) is composed of a block synchronizing signal (SYNC) of three samples, address (AD) and identification (ID) signals of two samples, an address and identification signal error check word (CRCC), the 96 samples of video information arranged as forty-eight words $W_1$ to $W_{48}$, and data check words $P_1$ and $Q_1$ of two samples each. The block synchronizing signal is used for identifying the beginning of a block, whereupon the address and identification signals AD/ID, the information data and the check words can be extracted. The identification signal ID indicates the particular channel (track), the frame, the field, and the line to which the information data of the block belong and whether such information data are even or odd, and the address signal AD represents the address of the respective block, that is, the location of the video data in each field. The check words constitute an error correcting code used for detection of errors in the data of the respective blocks.

Referring back to FIG. 2, the time base compression circuit 3a or 3b in each channel compresses the video data and provides a data blanking period in which the block synchronizing signal, inserts the identification and address signals and the check codes into each block of video data of 96 samples, and at the same time, sets up data blanking periods in which the blocks of the parity data are inserted. The output of the time base compression circuit 3a or 3b in each channel is supplied to the respective error correcting encoder 4a or 4b in which the parity data for the horizontal and vertical directions and the check words for each block are generated.

The block synchronizing signal and the identification and address signals are added to the video and parity data in the recording processor 5a or 5b in each channel. The address signal AD represents the previously-noted number of the block. Further, in each recording processor 5a or 5b, there are provided an encoder of the block coding type which converts the number of bits of one sample from 8 to 10, and a parallel-to-serial converter for serializing the parallel 10-bit code. As disclosed in detail, for example, in U.S. Pat. No. 4,387,364, issued June 7, 1983, and having a common assignee herewith, the block coding is such that $2^8$ codes whose DC levels are close to zero are selected from $2^{10}$ codes of 10-bit words and arranged to have a one-to-one correspondence with the original 8-bit codes. By means of the foregoing, the DC level of the record signal is made as close to zero as possible, that is, "0" and "1" alternate with each other as much as possible. Such block coding is employed for preventing degradation of the transmitted waveform on the playback side by achieving a substantial DC-free transmission. Further, since information included in the identification signal ID in each block is important for processing in the reproducing system, each recording processor 5a or 5b further generates the address and identification signal check code CRCC and adds the same to each block as shown in FIG. 4B.

The output of the recording processors 5a and 5b are fed to the multiplexer 6 where they are distributed to four channels through the recording amplifiers 7a-7d to the output terminals 8a-8d, respectively, as previously discussed. Four rotary heads (not shown) are connected to the output terminals 8a-8d through, for example, rotary transformers, whereby one scan by the four heads functions to record the four parallel tracks 9a-9d extending obliquely on the magnetic tape 10 which constitute one field of video information.

Referring now to FIG. 3, a reproducing section of a DVTR embodying this invention includes four input terminals 11a-11d for receiving the digital video signal reproduced by the four rotary heads. In particular, in the reproducing or playback operation of the DVTR according to this invention, the reproduced video data signals are derived from the four rotary heads which scan the tracks 9a-9d, respectively, and are applied through playback amplifiers 12a-12d to playback processors 13a-13d, respectively. The latter playback processors perform a waveshaping operation, convert the serial data into parallel form, extract the block synchronizing, identification (ID) and address (AD) signals and the check code from the data, and further perform a block decoding, i.e., 10-bit-to-8-bit conversion operation. In addition, in the block decoding operation, each 96-sample block of data is error detected for every 24 samples thereof. The outputs of playback processors 13a-13d are applied to respective time base correctors 14a–14d in which any time base error in the data is removed.

The data of each channel are provided from the respective time base correctors 14a–14d by way of a multiplexer 15 and an interchanger 16 to error correcting decoders 17a and 17b. In particular, the outputs from time base correctors 14a–14d are first applied to a multiplexer 15 in which the four outputs are reassembled into two channels and interchanger 16 functions to restore the mixed data from the multiplexer 15 to its correct order. In other words, in an ordinary playback operation in which the rotary heads faithfully scan the recording tracks on the magnetic tape or in slow motion or still picture playback in which the rotary heads are controlled in position so that they faithfully follow the recording tracks, respectively, signals are reproduced only from the tracks corresponding to the four rotary heads. However, during high speed playback, in which the running speed of the magnetic tape is as high as several dozen times its normal forward speed, the inclination of the scanning direction of the heads is different from that of the record tracks, as shown by the broken lines 9' in FIG. 5, so that each head scans obliquely to the tracks 9a–9d, and picks up a plurality of record tracks during each trace thereof. As a result, the signals reproduced from the different tracks are mixed together. In such a case, interchanger 16 identifies the correct channels of the reproduced signals, using track identification signals, and supplies the reproduced signals to the error correcting decoders 17a and 17b and, in particular, to the correct addresses in memories thereof, for the respective channel. In the case of reproduction at the normal reproducing speed, the data from the multiplexer 15 are merely passed through the interchanger 16 to the respective error correcting decoders. The interchanger 16 is also provided at its input with a circuit for assigning the correct identification signal to the blocks whenever errors occur in the identification signal ID.

Details of this interchanger are explained, for example, in U.S. Pat. No. 4,392,162, issued July 5, 1983, and having a common assignee herewith.

Each error correcting decoder 17a and 17b includes error detecting and correcting circuits using the horizontal and vertical parity data and the various data check words $P_1$ and $Q_1$. It should be appreciated that, during high speed reproducing, no error detection and correction are carried out using the horizontal and vertical parity data, even though errors in the respective identification signals are accommodated in interchanger 16. The error correcting decoders 17a and 17b each include a field memory. If uncorrectable data, that is, data with too many errors therein, are reproduced the data supplied to the error correcting decoders 17a and 17b are not written into the field memories, but rather, data which have preceded the uncorrectable data by one field are used in an interpolation or concealment process. The data from each error correcting decoder 17a and 17b are applied to respective time base expander circuits 18a and 18b which return the data to the original transmitting rate and then apply the data to a common multiplexer 19. The multiplexer 19 serves to return the reproduced data of the two channels into a single channel which is supplied to a signal processor 20 from which a reproduced color video signal is provided at an output terminal 21. The signal processor 20 separates the luminance and chrominance components from the color video signal, for example, by means of a digital filter, in order to correct the phase of the color subcarrier of the chrominance components by using 02123 the identification signal ID, whenever a concealment operation is carried out. In addition, the digital color video signal is converted into an analog color video signal by a D/A (digital-to-analog) converter (not shown).

As mentioned earlier, the frame identification signal, the field identification signal, and the line identification signal become rather important in carrying out an error concealing operation, particularly because the color subcarrier phase and the proper phase relation of the vertical and horizontal synchronizing pulses must be made correct where a digital data word from a line interval of one field, for example, is to be substituted for a data word in a corresponding line interval in a subsequent field. As mentioned before, the identification signals ID are used to identify the frame interval, field interval, and line interval associated with a particular block of video data as being odd or even, respectively. That is, the identification signal can contain a one-bit frame identification code FRMID, a one-bit field identification code FLDID, and a one-bit line identification code LINID, each of which has a value of "1" or "0" to represent odd or even, respectively.

It is possible that random and burst errors can affect the identification signals ID as well as the data words contained in any particular block. It has been previously proposed to use an error correcting coding method to accommodate errors in the identification signals ID in a manner similar to the way errors in the video data words $W_1$ to $W_{48}$ are corrected by using the parity words $Q_1$ and $Q_2$. However, use of an identification code error correction code adds additional overhead bits to each block of transmitted video data, thereby increasing the redundancy of the data. In addition, the use of an error correcting code for the identification signals ID requires additional circuit complexity both in the transmit or recording side (FIG. 2) and in the receive or playback side (FIG. 3).

Furthermore, where an error occurs in a parity word or other error correction word associated with the address and identification signals AD and ID, it is possible that attempted error correction can lead to miscorrection of the identification signal ID, so that, for example, a particular odd frame, field, or line is misidentified as being even.

Because of the cyclical nature of the identification signals ID, and because the frame identification signal FRMID and the field identification signal FLDID are constant within any particular frame and field, respectively, it is possible to provide a synthetic identification signal determined by sampling the identification signals FRMID or FLDID for a plurality of blocks of the video data and providing the synthetic identification signal as indicating odd or even depending on whether the majority of the sampled identification signals FRMID or FLDID are odd or even. Until a determination is made whether this majority indicate odd or even, a previously determined synthetic identification signal is provided.

Figure 6:
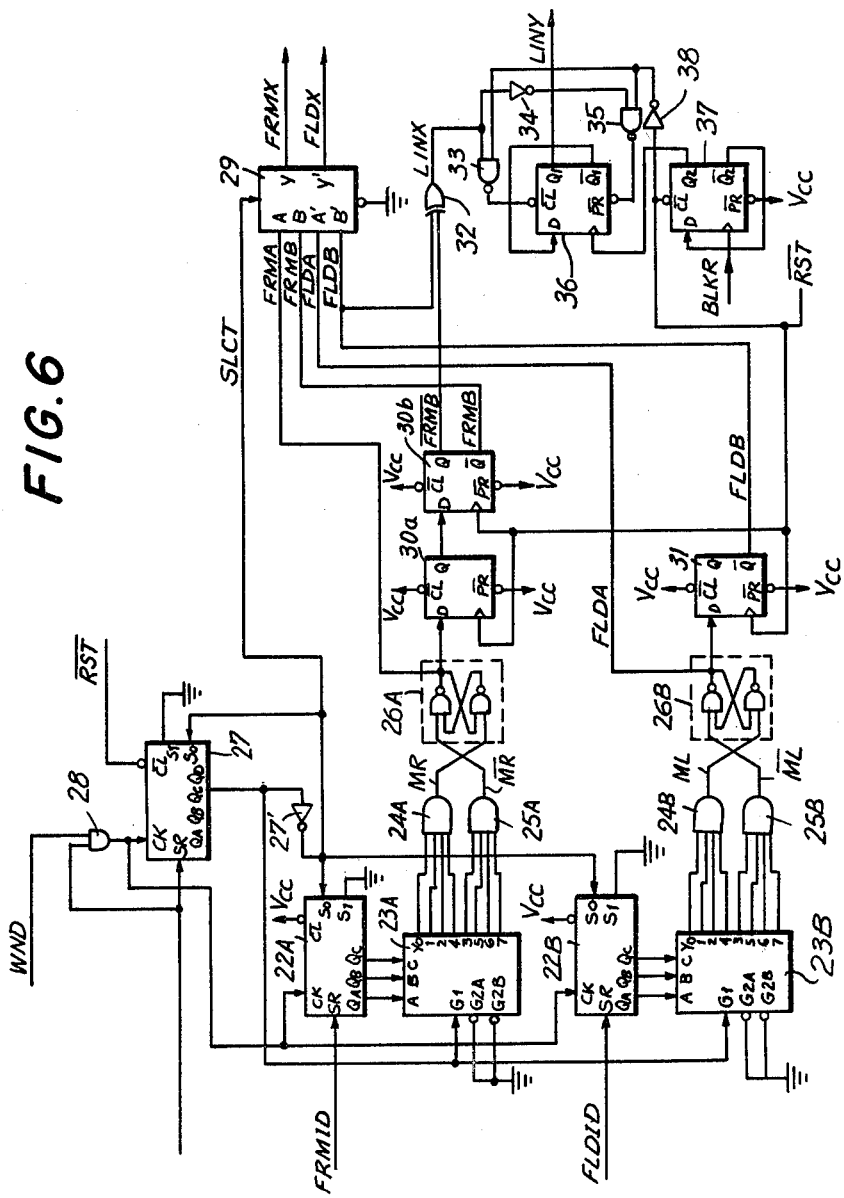
FIG. 6 is a block schematic diagram of one embodiment of a control signal detecting circuit according to this invention which can be used in the playback section of FIG. 3.

One embodiment of a circuit carrying out this operation is shown in FIG. 6, and can be incorporated, for example, into the interchanger 16.

The circuit of this embodiment includes a frame identification shift register 22A and a field identification shift register 22B, which receive and store the frame identification signals FRMID and field identification signals FLDID, respectively. Three outputs $Q_A$, $Q_B$, and $Q_C$ of each of the shift registers 22A and 22B are coupled to inputs A, B, and C, respectively, of associated decoders 23A and 23B. In this instance, the decoders are three-to-eight code converters, and each of the decoders 23A and 23B has eight outputs $Y_0$ to $Y_7$. The outputs $Y_0$, $Y_1$, $Y_2$, and $Y_4$ of each decoder 23A and 23B are coupled to inputs of an associated AND gate 24A and 24B, respectively. Likewise, the remaining outputs $Y_3$, $Y_5$, $Y_6$, and $Y_7$ are connected to another associated AND gate 25A and 25B. The AND gate 24A provides a majority-of-frame signal $\overline{MR}$, which is "1" when a majority of the outputs $Q_A$, $Q_B$, $Q_C$ of the shift register 22A are "1", but is "0" otherwise. The AND gate 25A provides a minority-of-frame signal MR which is complementary to the majority-of-frame signal MR.

In like fashion, the AND gate 24B provides a majority-of-field signal ML which is "1" whenever the majority of the outputs $Q_A$, $Q_B$, $Q_C$ of the shift register 22B are "1", but which is otherwise "0". The AND gate 22B provides a minority-of-field signal $\overline{ML}$ which is complementary thereto.

In order to provide the majority-of-frame signal MR and a majority-of-field signal ML, the outputs $Y_0$–$Y_7$ of the decoders 23A and 23B are provided as a function of the inputs A, B, C thereto, as illustrated in the following table:

| Input of 23A or 23B | | | Output of 23A or 23B | | | | | | | | MR or ML | $\overline{MR}$ or $\overline{ML}$ |
|---|---|---|---|---|---|---|---|---|---|---|---|---|
| A | B | C | $Y_0$ | $Y_1$ | $Y_2$ | $Y_3$ | $Y_4$ | $Y_5$ | $Y_6$ | $Y_7$ | | |
| 0 | 0 | 0 | 0 | 1 | 1 | 1 | 1 | 1 | 1 | 1 | 0 | 1 |
| 0 | 0 | 1 | 1 | 0 | 1 | 1 | 1 | 1 | 1 | 1 | 0 | 1 |
| 0 | 1 | 0 | 1 | 1 | 0 | 1 | 1 | 1 | 1 | 1 | 0 | 1 |
| 0 | 1 | 1 | 1 | 1 | 1 | 0 | 1 | 1 | 1 | 1 | 1 | 0 |
| 1 | 0 | 0 | 1 | 1 | 1 | 1 | 0 | 1 | 1 | 1 | 0 | 1 |
| 1 | 0 | 1 | 1 | 1 | 1 | 1 | 1 | 0 | 1 | 1 | 1 | 0 |
| 1 | 1 | 0 | 1 | 1 | 1 | 1 | 1 | 1 | 0 | 1 | 1 | 0 |
| 1 | 1 | 1 | 1 | 1 | 1 | 1 | 1 | 1 | 1 | 0 | 1 | 0 |

Each of the pairs of AND gates 24A, 25A, and 24B, 25B is followed by a respective RS latch circuit 26A and 26B to store the majority-of-frame signal MR and the majority-of-field signal ML and to provide the synthetic frame and field identification signals FRMA and FLDA, respectively.

Another shift register 27 is provided to control the operation of the frame and field shift registers 22A and 22B. An inverse error signal $\overline{ERR}$ is provided to a sampling input SR of the shift register 27. This signal $\overline{ERR}$ has a value of "1" if it is determined that the address and identification signal AD and ID are error-free, but has a value of "0" if there is an error detected in the signals AD and ID. This signal $\overline{ERR}$ can be conveniently provided in response to processing of the check code word CRCC. An AND gate 28 has its output coupled to a clock input CK of the shift register 27 and has inputs coupled to receive the inverse error signal $\overline{ERR}$ and also to receive a window pulse WND which is provided for each block of the video data during the occurrence of the address and identification signals AD and ID. An inverse reset pulse $\overline{RST}$ (FIG. 7A), which has a rising edge at the onset of each field interval, is provided to the clear terminal $\overline{CL}$ of the shift register 27. A third output $Q_C$ of the shift register 27 is coupled to a latching input $G_1$ of each of the decoders 23A and 23B, and is also coupled through an inverter 27' to enabling terminals $S_O$ of each of the shift registers 22A, 22B, and 27.

The inverter 27' also provides its output as a selecting signal SLCT to a selector 29 to be described later.

In operation, the output $Q_C$ of the shift register 27 is set to "0" at the beginning of each field interval, and is set to "1" when three error-free identification signals FRMID and FLDID have occured. Consequently, the outputs $Q_A$, $Q_B$, $Q_C$ of the frame and field shift registers 22A and 22B store values of the frame and field identification signals FRMID and FLDID, which can be assumed to be valid. Therefore, the synthetic frame and field identification signals FRMA and FLDA, which represent the majority of three identification signals which are presumed to be valid, has a high reliability.

D-type flip-flops 30a and 30b follow the RS latch 26A to provide a second synthetic frame identification signal FRMB which can be used until such time as three error-free error signals ID are obtained. These D-type flip-flops 30a and 30b are connected in cascade, with the signal $\overline{RST}$ being applied to the clock inputs thereof. The synthetic identification signal FRMA is applied to the D input of the flip-flop 30a, whose uninverted output Q is coupled to the D input of the flip-flop 30b. The inverted output $\overline{Q}$ of this flip-flop 30b provides the second synthetic frame identification signal FRMB.

It should be understood that during normal circumstances, the identification signals FRMA and FRMB are in phase with one another. The identification signal FRMB will change values at the onset of each frame, in response to the signals $\overline{RST}$, whereas the identification signal FRMA will not change values until such time that three error-free identification signals FRMID are received. Thus, the second synthetic frame identification signal FRMB can be used until the value of the identification signal FRMA is determined.

Similarly, another D-type flip-flop 31 is provided following the RS latch 26b to generate a second synthetic field identification signal FLDB at its inverted output $\overline{Q}$. This second field identification signal FLDB is used as the field identification signal until such time as the value of the field identification signal FLDA is determined.

The selector 29 in this embodiment acts, in effect, as a two-pole, two-throw electronic switch. A first pair of inputs A and B thereof receive the synthetic frame identification signals FRMA and FPMB respectively, while a second pair of input terminals A' and B' receive the synthetic field identification signals FLDA and FLDB, respectively. A pair of output terminals Y and Y' provide output frame and field identification signals FRMX and FLDX, respectively. In this arrangement, whenever the signal SLCT from the inverter 27' is "0", the inputs A and A' are respectively coupled to the outputs Y and Y', and whenever the signal SLCT is "1", the inputs B and B' are respectively coupled to the outputs Y and Y'. Because the signal SLCT is "1" until the values of the majority-of-frame signal MR and majority-of-field signal ML are determined, and is "0" thereafter, the selector 29 provides the second synthetic frame and field identification signals FRMB and FLDB as the output identification signals FRMX and FLDX from the onset of each field until a majority of the received frame and field identification signals FRMD and FLDID are determined. However, at the time that judging the majority of the frame and field identification signals FRMID and FLDID is completed, the selector 29 provides the synthetic frame and field identification signals FRMA and FLDA as the respective output identification signals FRMX and FLDX.

A synthetic line identification signal LINY can be provided by considering the relation of the frame, field, and line identification signals, as illustrated in FIG. 1A–1C. In this embodiment, the second synthetic field identification signal FLDB is provided to one input of an exclusive-OR gate 32, while an inverse frame identification signal $\overline{FRMB}$ is provided from the non-inverting output Q of the flip-flop 30b to another input of the exclusive-OR gate 32. Thus, the gate 32 provides a signal LINX which is the modulo-2 sum of the signals FLDB and $\overline{FRMB}$. This signal LINX is provided to an input of a NAND gate 33 and also through an inverter 34 to an input of another NAND gate 35. The output of the NAND gates 33 and 35 are coupled respectively to a clear terminal CL and a preset terminal PR of a D-type flip-flop 36. Another D-type flip-flop 37 is connected in advance of the flip-flop 36, and has an uninverted output $Q_2$ coupled to the clock input of the flip-flop 36. The inverted outputs $\overline{Q_1}$ and $\overline{Q_2}$ of these flip-flops are coupled to their respective D input terminals. A block signal BLKR (FIG. 7B) is applied to the clock input of the flip-flop 37, and the signal $\overline{RST}$ is applied to the clear input terminal CL of this flip-flop 37, and, through an inverter 38, to respective inputs of the NAND gates 33 and 35.

Figure 4B:
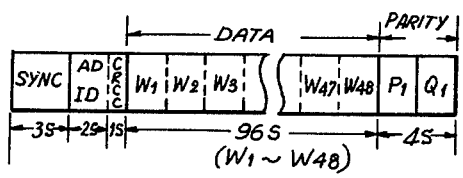

The block signal BLKR has the duration of one superblock, formed of four of the data blocks as illustrated in FIG. 4B. Consequently, it should be understood that the signal BLKR occurs at a frequency twice the horizontal line frequency.

The signal $\overline{RST}$ clears the flip-flop 37 at the onset of each field interval, so that the uninverted output $Q_2$ of the flip-flop 37 has a value of "1" upon the first occurrence of the signal BLKR. Consequently, the uninverted and inverted outputs $Q_2$ and $\overline{Q_2}$ of the flip-flop 37 oscillate at twice the line rate, as shown in FIG. 7C and 7D, respectively. If the signal LINX is "1", indicating that both the frame and the field are of the same state (i.e., both are even or both are odd), the NAND gate 35 presets the flip-flop 36, so that the uninverted output $Q_1$ thereof provides the synthetic line indication signal LINY which is "1" initially, and is alternately "0" and "1" as illustrated in FIG. 7E. However, if the signal LINX is "0", indicating that the frame and field identification signals are of opposite states (i.e., one is even and the other odd) then the NAND gate 33 clears the flip-flop 36, so that the synthetic line identification signal LINY is initially "0" and thereafter alternates between "1" and "0" as shown in FIG. 7F.

It should be appreciated that other arrangements of the identification signal circuit are possible within the scope of this invention. For example, it should be understood that although in this embodiment three frame identification signals FRMID and three field identification signals FLDID are sampled, and a majority of such three samples are used to develop the signals MR and ML, respectively, any odd plurality of signals, such as 5, 7, or 9 samples, could be used instead.

Furthermore, although the described embodiment is used with a digital television signal according to the NTSC system, the described embodiment could be adapted, within the purview of this invention, to accomodate digital color video signals according to the PAL system or the SECAM system. Still further, the present invention could also be used with a digital audio signal, especially if encoded to be recorded on a video recorder.

Having described a specific preferred embodiment of this invention, it is to be understood that the invention is not limited to that precise embodiment, and that various changes and modifications may be effected therein by one skilled in the art without departing from the scope or spirit of the invention as defined in the appended claims.

What is claimed is:

1. A method of assigning a control value having one of two complementary states to a transmitted digital signal arranged in blocks of digital data and having a control signal with one of two complementary states at a predetermined location in each such block to identify the respective block as being of an odd type or an even type, comprising detecting errors occurring in said control signal;

sampling and storing the control signal, beginning at periodic times when said blocks are expected to change over from one of said odd and even types to the other thereof, for a plurality of said blocks where the control signal therein is detected to be free of errors;

judging whether there is a majority of blocks in which a sampled and stored control signal has one or the other of said complementary states;

providing as said control value an identifying signal whose state is determined by the state of the judged majority of the blocks; and following a subsequent such periodic time and until a majority of blocks in which a sampled and stored control signal has one or the other of said complementary states is judged, providing as said control value a supplemental identifying signal based on a previously determined identifying signal.

2. A method of assigning a control value according to claim 1, wherein said digital signal is a video signal having frame intervals, field intervals within each said frame interval, and line intervals within each said field interval, and each said block has an identification signal to identify the frame interval and the field interval associated therewith as being odd or even.

3. A method of assigning a control value according to claim 2, wherein each said line interval of the digital video signal is constituted by a plurality of said blocks.

4. A method of assigning identifying signals having one of two complementary states to each block of a transmitted digital video signal arranged as a succession of such blocks and having a control signal disposed at a predetermined data location within each such block, the digital video signal being constituted by a succession of frame intervals, each being formed of two field intervals, with each field interval being formed of a plurality of line intervals such that there are provided an odd number of line intervals in each said frame interval, with the line intervals, the field intervals, and the frame intervals each alternating between an even type and an odd type, and with the control signal including at least a field identifying portion and a frame-identifying portion having states for identifying the associated frame interval and field interval, respectively, as being of the even type or the odd type; comprising detecting errors occurring in said control signal;

sampling and storing the control signal for an odd plurality of said blocks in which said control signal is detected to be free of errors;

judging whether the frame-identifying portions of the sampled and stored control signal in each block are predominantly of the type identifying the associated frame interval as odd or as even;

providing a frame identifying signal having one of two complementary values as determined by said judging;

judging whether the field-identifying portions of the sampled and stored control signal in each block are predominantly of the type identifying the associated field interval as odd or as even;

providing a field identifying signal having one of two complementary values as determined by the last-mentioned judging;

establishing a line identifying signal of one of two complementary states to identify the associated line interval as being of the odd type of the even type, which line identifying signal is set to one of said complementary states at the onset of each said field interval in dependence on a logic combination of said frame identifying signal and said field identifying signal; and thereafter, for each succeeding line interval in such field interval, alternating the state of said line identifying signal.

5. A method of assigning identifying signals according to claim 4, wherein said logic combination includes an exclusive-OR combination of said frame identifying signal and said field identifying signal.

6. A method of assigning identification signals having one of two complementary states to each block of a transmitted digital video signal arranged as a succession of such blocks and having a control signal disposed at a predetermined data location within each such block, the digital video signal being constituted by a succession of frame intervals, each being formed of two field intervals, with each said field interval being formed of a plurality of line intervals such that there are provided an odd number of line intervals in each said frame interval with the line intervals, the field intervals, and the frame intervals each alternating between an odd type and an even type, and with the control signal including at least a field identifying portion and a frame identifying portion having states for identifying the associated frame interval and the field interval, respectively, as being of the even type or the odd type; comprising detecting errors occurring in said control signal;

sampling and storing, at the commencement of each said field interval, the control signal for an odd plurality of said blocks detected to be free of errors;

Judging whether the frame-identifying portions of the blocks in which the control signal has been sampled and stored are predominantly of the type identifying the associated frame interval as odd or as even;

providing a frame identifying signal having one of two complementary values as determined by said judging;

judging whether the field-identifying portions of the blocks in which the control signal has been sampled and stored are predominantly of the type identifying the associated field interval as odd or as even;

providing a field identifying signal having one of two complementary values as determined by the last-mentioned judging; and at the commencement of a successive field interval, and until the control signal in a plurality of the blocks is sampled and stored and the frame-identifying and field-identifying portions thereof are judged, providing supplemental frame and field identifying signals based on the frame and field identifying signals, respectively, associated with a just-concluded field interval.

7. Apparatus for providing an identifying signal based on a control signal having one of two complementary states and occurring at regular periodic intervals in a transmitted digital signal, comprising error detector means for producing an error signal having one value when said control signal is detected to be error free and another value when the same is detected to be in error;

sampling means for sampling and storing the control signal at an odd plurality of said regular periodic intervals when said error signal has said one value;

judging means for judging whether the sampled and stored control signal at a majority of the regular periodic intervals is of one state or of the complementary state, and providing an identifying signal based on the judged state of the control signal in said majority of regular periodic intervals;

control means for causing said sampling means to sample and store the control signal at successive pluralities of said regular periodic intervals and to cause said judging means to judge a majority of such samples;

memory means for storing said identifying signal at least until a successive plurality of intervals containing said control signal is sampled and stored and a successive identifying signal based on the judged state of majority of said successive plurality is provided;

and selector means providing the stored identifying signal as an output identifying signal during the time, as controlled by said control means, that said control signal contained in the successive plurality of regular periodic intervals is being sampled, and providing said successive identifying signal commencing at the time, as controlled by said control means, that the state of a majority of said successive plurality is judged.

8. Apparatus for providing an identifying signal according to claim 7, wherein said sampling means includes a shift register receiving said control signal at an input thereof, capable of storing up to an odd plurality n of samples, and having a corresponding plurality n of output terminals; and said judging means includes code converting means having n input terminals each coupled to a respective one of said output terminals of said shift register, and a different plurality m of output terminals, and logic gate means coupled to said m output terminals of said code converting means to provide a logic output which is "1" when a majority of the n output terminals of said shift register provides a value of "1", but to provide a "0" when a majority of said n output terminals provides a value of "0".

9. Apparatus for providing an identifying signal according to claim 8, wherein an output of one logic state is provided at only one of said output terminals of said code converting means for each particular configuration of input values applied to said n input terminals thereof, with the remaining output terminals being provided with an output of the complementary logic state; and wherein said logic gate means includes at least one AND gate having inputs coupled to selected ones of said output terminals.

10. Apparatus for providing an identifying signal according to claim 8, wherein said memory means includes flip flop means for storing said identifying signal and inverting the stored identifying signal at periodic intervals at which the control signal occurring at regular periodic intervals in the transmitted digital signal is expected to be inverted.

11. Apparatus for providing an identifying signal according to claim 7, wherein said error detector means includes counting means having reset means whereby said counting means is reset at times when the state of said control signal is expected to change for counting said odd plurality of regular periodic intervals in which said control signal is sampled and stored by said sample means occurring when said error signal has said one value, and means responsive to said counting means for providing a selecting signal to said selector means in response to a predetermined count of said counting means.

12. Apparatus for providing an identifying signal according to claim 11, wherein said means responsive to said counting means includes means for continuing the provision of said selecting signal until said counting mmeans is thereafter reset by said reset means.

13. Apparatus for providing an identification signal having one of two complementary states to each block of a transmitted digital video signal arranged as a succession of such blocks and having a control signal disposed at a predetermined data location within each such block, the digital video signal being constituted by a succession of frame intervals, each being formed of two field intervals, with each field interval being formed of a plurality of line intervals such that there are provided an odd number of line intervals in each said frame interval, with the line intervals, the field intervals, and the frame intervals each alternating between an even type and an odd type, and with the control signal including at least a field identifying portion and a frame identifying portion having states for identifying the associated frame interval and field interval, respectively, as being of the odd type or the even type; comprising detecting means for detecting whether said control signal contains errors or is free of errors;

sampling means for sampling and storing the control signal for an odd plurality of said blocks in which said control signal is detected to be free of errors by said detecting means;

frame judging means for judging whether the frame-identifying portions of the sampled and stored control signal in said odd plurality of blocks are predominantly of the type identifying the associated frame interval as odd or as even;

logic means providing a frame identifying signal having one of two complementary values as determined by said frame judging;

field judging means for judging whether the field-identifying portions of the sampled and stored control signal in said odd plurality of blocks are predominantly of the type identifying the associated field interval as odd or as even;

logic means providing a field identifying signal having one of two complementary values as determined by said field judging;

line-identifying means for establishing a line identifying signal of one of two complementary states to identify the associated line interval as being of the odd type or of the even type, which line identifying signal is set to one of said complementary states at the onset of each said field interval in dependence on a logic combination of said frame identifying signal and said field identifying signal; and means causing said line-identifying means to switch over for each succeeding line interval in such field interval to alternate the state of said line identifying signal.

14. Apparatus for providing an identification signal according to claim 13, wherein said line identifying means includes an exclusive-OR gate coupled to receive said frame identifying signal and said field identifying signal and providing an exclusive-OR output; means to receive an indicating signal indicating the commencement of a field interval; flip flop means triggered at the rate of said line intervals and having an output, a clear terminal, and a preset terminal; and a logic circuit providing a clear signal to said clear terminal when said indicating signal occurs while said exclusive-OR output has one value but providing a preset signal to said preset terminal when said indicating signal occurs while said exclusive-OR output has another value complementary to said one value.

* * * * *